United States Patent [19]

Vottero-Fin et al.

[11] Patent Number: 4,982,996

[45] Date of Patent: Jan. 8, 1991

[54] AUTOMOTIVE SEATING SYSTEM FEATURING A TELEVISION SET

[75] Inventors: Alberto Vottero-Fin, Trinita; Luigi Prato, Villarbasse, both of Italy

[73] Assignee: Fiat Auto S.p.A., Torino, Italy

[21] Appl. No.: 479,960

[22] Filed: Feb. 14, 1990

[30] Foreign Application Priority Data

Feb. 17, 1989 [IT] Italy ................................. 5282 B/89

[51] Int. Cl.⁵ ............................................... A47C 7/62
[52] U.S. Cl. ..................................... 297/194; 296/21; 298/917
[58] Field of Search .................. 297/194, 411, 417; 296/21; 248/917, 918

[56] References Cited

U.S. PATENT DOCUMENTS

| | | | |
|---|---|---|---|
| 2,859,803 | 11/1958 | McCallister | 297/194 X |
| 4,298,893 | 11/1981 | Holmes | 248/917 X |
| 4,674,790 | 6/1987 | Johnson | 297/194 X |
| 4,701,627 | 10/1987 | Gambuti et al. | 296/21 |
| 4,826,245 | 5/1989 | Entratter | 248/917 |
| 4,868,888 | 9/1989 | Dayton | 297/194 X |

Primary Examiner—Peter A. Aschenbrenner
Attorney, Agent, or Firm—Frost & Jacobs

[57] ABSTRACT

A seating system consisting of two side by side front seats and at least a rear seat, all housed inside the passenger compartment of an automobile; characterized by the fact that it presents at least a television set built permanently into a lift-up armrest between the two front seats, so that the television screen defines at least part of the front side of the rear wall of the armrest. The seating system may also comprise a video tape reader/recorder housed underneath the rear seat or inside the luggage compartment of the vehicle, so as to form a complete television system. (FIG. 1).

6 Claims, 2 Drawing Sheets

AUTOMOTIVE SEATING SYSTEM FEATURING A TELEVISION SET

BACKGROUND OF THE INVENTION

The present invention relates to an automotive seating system housed inside the passenger compartment and featuring a television set operatable from inside the vehicle, for the entertainment in particular of the rear seat passengers.

Known automotive television sets usually consist of portable mini sets secured by various means to some point inside the passenger compartment, e.g. to the seating system consisting of the front seats and rear bench seat. The use of television sets secured to the seats or other members inside the passenger compartment of the vehicle poses a number of problems and, in view of the size of the equipment involved, is rarely feasible on moving vehicles, with the exception of those other than cars, e.g. vans or similar. To overcome the aforementioned drawbacks, Japanese Patent No. n.58.128942 provides for a mini set built into the back of the headrest on one of the front seats. Such a solution, however, fails to provide for all-round viewing comfort, on account of the lateral location of the set and the extremely small size of the same for enabling it to be accommodated inside the headrest Moreover, in the event of a head-on crash, severe facial injuries may be caused by the passenger seated directly in front of the set being hurled against the screen.

SUMMARY OF THE INVENTION

The aim of the present invention is to provide a seating system, particularly an automotive seating system, designed to effectively accommodate a television set and involving no danger to passengers.

With this aim in view, according to the present invention, there is provided an automotive seating system comprising two side by side front seats with an armrest in between, and at least a rear seat; characterized by the fact that it comprises a television set built permanently inside said armrest so that the television screen defines at least part of the front side of the rear wall of said armrest.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
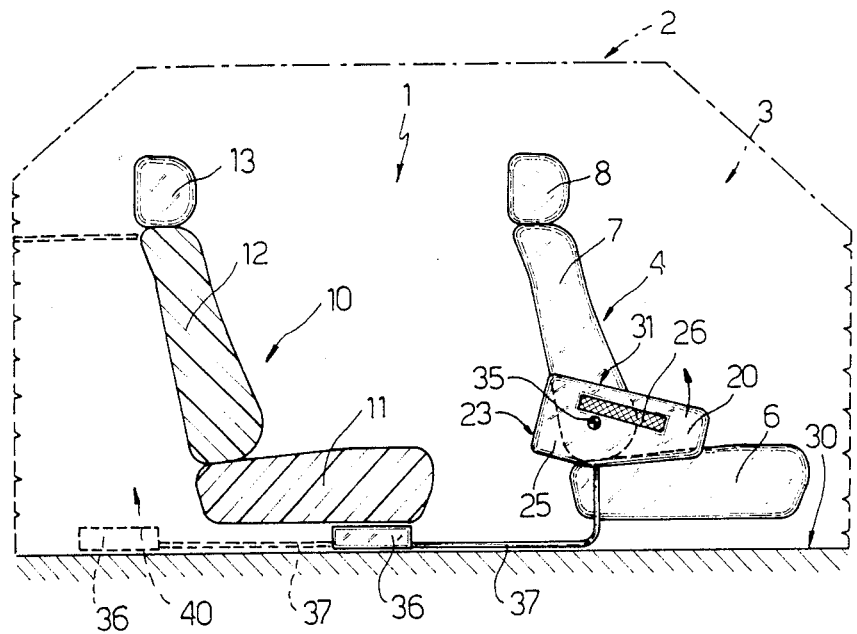
FIGS. 1 and 2 show side views of the seating system according to the present invention in two operating positions.

Number 1 in the accompanying drawings indicates a seating system for a vehicle 2 (shown by the dotted line in FIG. 1) of any known type, e.g. a car. Said seating system 1 is housed inside the passenger compartment 3 of vehicle 2, and comprises two known, separate, side by side, front seats 4 and 5, each comprising a seat portion 6 and backrest 7, possibly fitted with a headrest 8; and at least a rear seat 10, in the example shown, a known type of bench seat, also comprising a seat portion 11 and backrest 12, possibly fitted with a headrest 13. In the case of long wheel base vehicles 2, such as limousines or similar, seating system 1 may comprise further known types of rear side seats or jump seats (not shown).

According to the present invention, seating system 1 also comprises a lift-up armrest 20 located between front seats 4 and 5; and a known type of television set 21 of appropriate size built permanently into armrest 20, so that the front side of rear wall 23 of armrest 20 is defined partly by a screen 22 and partly by a panel 24 controlling set 21. In particular, armrest 20 comprises set 21, and a padded housing 25 designed to accommodate and the open rear end of which is closed off by the front portion of set 21, i.e. screen 22, and control panel 24. For cooling set 21, housing 25 presents, preferably on both sides, a lateral ventilating grill 26.

Figure 2:
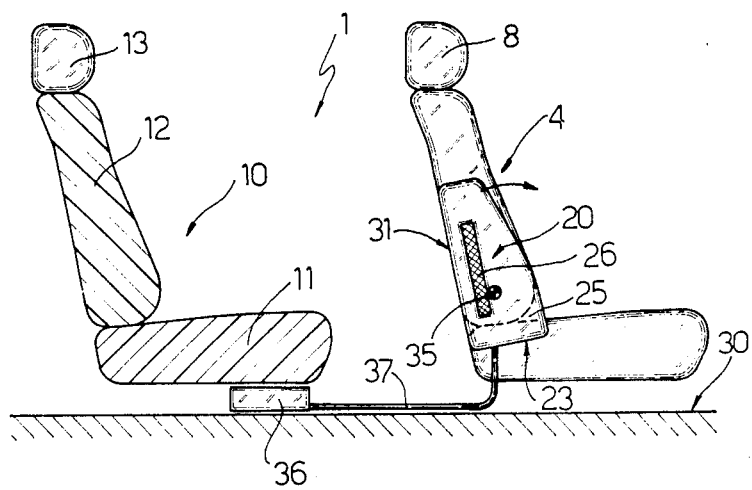
Figure 3:
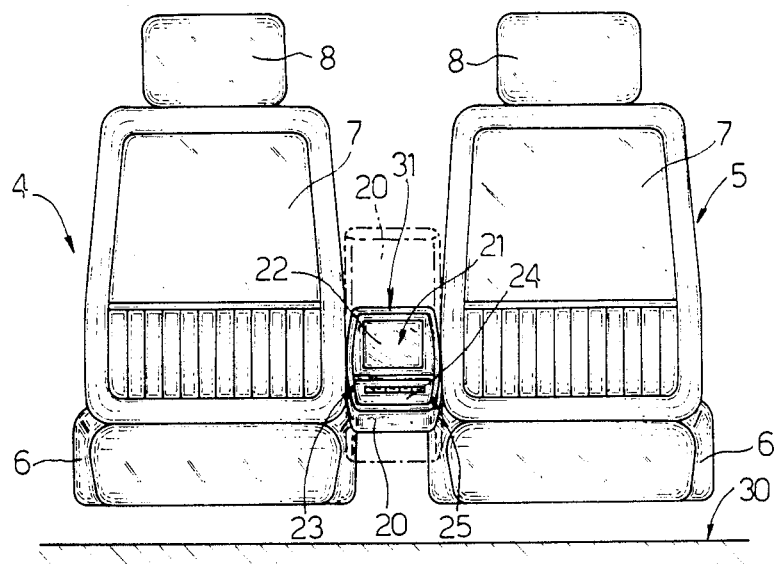
FIGS. 3 and 4 show a front and bottom plan view respectively of the FIG. 1 and 2 system.
Figure 4:
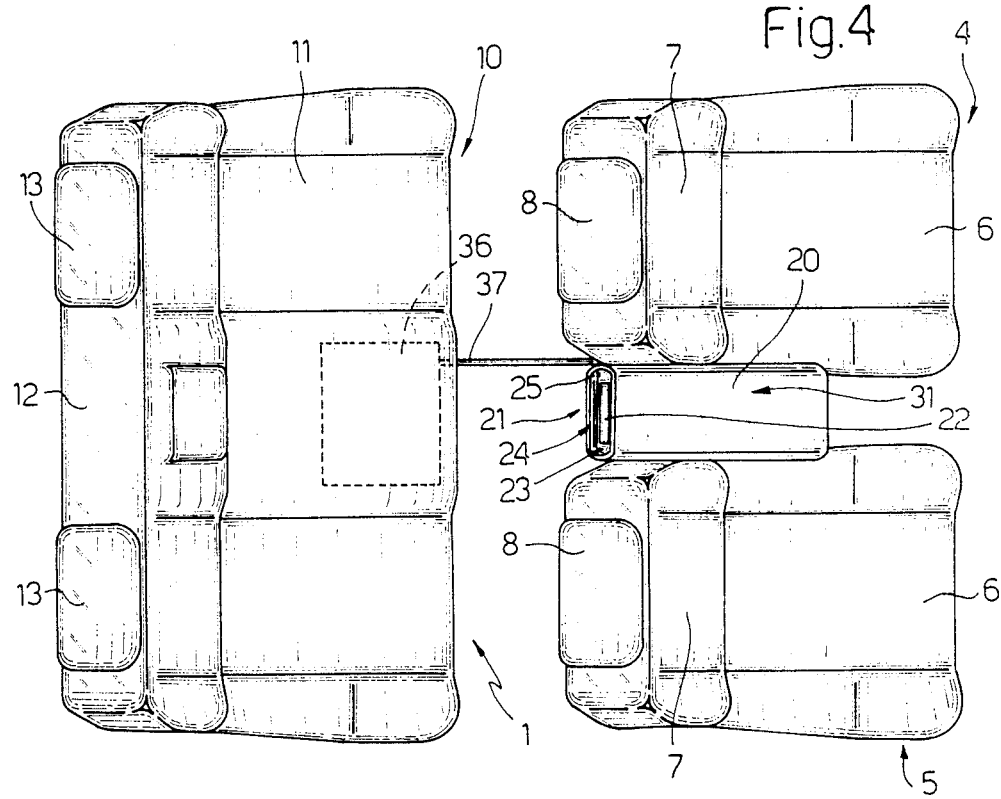

Armrest 20 is supported between front seats 4 and 5 so as to swing between an idle position (as shown in FIG. 2 and by the dotted line in FIG. 3) wherein it is arranged substantially parallel to and to the side of backrests 7, with screen 22 facing the floor 30 of vehicle 2, and an operating position (FIGS. 1, 3 and 4) wherein screen 22 is arranged facing rear seat 10, and the upper supporting surface 31 is arranged between and substantially parallel to respective seat portions 6, so as to act as an armrest for the front occupants of vehicle 2. To enable troublefree viewing of set 21 from rear seat 10, armrest 20 is so designed that, in the operating position, screen 22 faces slightly upwards. In the example shown, this is achieved by pivoting armrest 20 about point 35 so that, in the operating position, it is arranged slightly obliquely in relation to floor 30. Seating system 1 as described above may also comprise a video tape reader/recorder 36 of any known type connected to set 21, e.g. by cable 37, and located next to rear seat 10, e.g. underneath seat portion 11. According to a variation not shown, video tape reader/recorder 36 may also be built into seat portion 11, for enabling direct loading/control by the rear seat passengers from inside compartment 3. According to a further variation (shown by the dotted line in FIG. 1), video tape reader/recorder 36 is simply housed inside the luggage compartment 40 of vehicle 2 and set up, e.g. by the driver, before setting off on long journeys. In this case, control panel 24 may also provide for controlling video tape recorder 36, thus enabling direct en route control by the rear seat passengers.

The advantages of the present invention will be clear from the foregoing description. Firstly, in the idle position, set 21 is arranged with the screen facing downwards, thus eliminating any possibility of accidental impact by the rear passengers, and in no way affecting normal operation of armrest 20. Secondly, the relatively large size of armrest 20 enables the use of a fairly large screen 22 thus providing for improved viewing comfort. Thirdly, the overall design of seating system 1 is extremely straightforward, efficient and compact. And lastly, the central location of screen 22 provides for all-round viewing comfort with no risk to passengers (e.g. facial injuries) in the event of a collision, by virtue of set 21 being built into armrest 20 and therefore safely protected between front seats 4 and 5.

We claim:

1. An automotive seating system comprising two side by side front seats with an armrest in between, and at least a rear seat; characterized by the fact that it comprises a television set built permanently inside said armrest so that the television screen defines at least part of the front side of the rear wall of said armrest.

2. A seating system as claimed in claim 1, characterized by the fact that said front side of said rear wall of said armrest is defined partly by said screen and partly by the control panel of said television set.

3. A seating system as claimed in claim 1, characterized by the fact that said armrest comprises a padded housing designed to accommodate and the open rear end of which is closed off by said television set; said housing being provided laterally with at least a ventilation grill.

4. A seating system as claimed in claim 1, characterized by the fact that said armrest is supported between said two front seats so as to swing between an idle position, wherein it is arranged substantially parallel to and to the side of the respective seatbacks of said front seats, with said screen facing the floor of the vehicle, and an operating position wherein said armrest is arranged with said screen facing said rear seat, and with its upper surface arranged between the respective seat portions of said front seats.

5. A seating system as claimed in claim 4, characterized by the fact that, with said armrest in said operating position, said screen faces slightly upwards to enable troublefree viewing from said rear seat.

6. A setting system as claimed in claim 1, characterized by the fact that it also comprises a video tape reader/recorder connected to said television set and located close to said rear seat.

* * * * *

UNITED STATES PATENT AND TRADEMARK OFFICE
CERTIFICATE OF CORRECTION

PATENT NO. : 4,982,996
DATED : January 8, 1991
INVENTOR(S) : Alberto Vottero-Fin and Luigi Prato It is certified that error appears in the above-identified patent and that said Letters Patent is hereby corrected as shown below:

Title Page:
[30] Foreign Application Priority Data
Feb. 17, 1989 [IT]    Italy................5282 B/89
                          should read --52 882-B/89--

Signed and Sealed this

Twentieth Day of October, 1992

Attest:

DOUGLAS B. COMER

*Attesting Officer*        Acting Commissioner of Patents and Trademarks